United States Patent
Miyazaki

(10) Patent No.: US 9,052,205 B2
(45) Date of Patent: Jun. 9, 2015

(54) TERMINAL DEVICE, INFORMATION PROCESSING METHOD, AND PROGRAM

(75) Inventor: Ryoji Miyazaki, Saitama (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 304 days.

(21) Appl. No.: 13/590,275

(22) Filed: Aug. 21, 2012

(65) Prior Publication Data

US 2013/0109414 A1   May 2, 2013

Related U.S. Application Data

(60) Provisional application No. 61/551,494, filed on Oct. 26, 2011.

(51) Int. Cl.
| | |
|---|---|
| H04M 3/42 | (2006.01) |
| H04L 29/06 | (2006.01) |
| H04W 24/00 | (2009.01) |
| G01C 21/20 | (2006.01) |
| H04W 4/02 | (2009.01) |
| G01S 19/13 | (2010.01) |

(52) U.S. Cl.
CPC ............... *G01C 21/20* (2013.01); *G01S 19/13* (2013.01); *H04W 4/02* (2013.01); *H04W 4/028* (2013.01)

(58) Field of Classification Search
CPC ....... G07C 5/008; G08G 1/202; G08G 1/0112
USPC .............. 455/414.2, 414.3, 456.1–456.5; 701/455, 212, 519

See application file for complete search history.

(56) References Cited

U.S. PATENT DOCUMENTS

| | | | | |
|---|---|---|---|---|
| 2002/0123329 | A1* | 9/2002 | Murray | 455/414 |
| 2004/0002303 | A1* | 1/2004 | Hirokawa | 455/11.1 |
| 2004/0204851 | A1* | 10/2004 | Fukuyasu | 701/213 |
| 2005/0253753 | A1* | 11/2005 | Lalik et al. | 342/357.13 |
| 2009/0184982 | A1* | 7/2009 | Takakura et al. | 345/681 |
| 2010/0138154 | A1* | 6/2010 | Kon et al. | 701/212 |

FOREIGN PATENT DOCUMENTS

JP    09-258087    10/1997

* cited by examiner

*Primary Examiner* — Dung Hong
(74) *Attorney, Agent, or Firm* — Oblon, McClelland, Maier & Neustadt, L.L.P.

(57) ABSTRACT

A terminal device that includes a display that displays an image; a positioning unit that measures a current position; a memory that stores information corresponding to a plurality of positions measured by the positioning unit in association with a time at which each of the plurality of positions was measured; and a controller that controls the display to display a travel trace on a map based on the information stored in the memory and that variably sets a display scale of the map according to a travel speed or traveled distance per unit time corresponding to the travel trace.

16 Claims, 8 Drawing Sheets

FIG. 3

| TIME | POSITION |
|---|---|
| ... | ... |
| $t_{1000} = 12:00:00$ | $P_{1000}$ |
| $t_{1001} = 12:00:05$ | $P_{1001}$ |
| $t_{1002} = 12:00:13$ | $P_{1002}$ |
| $t_{1003} = 12:00:20$ | $P_{1003}$ |
| ... | ... |

| TIME | BEHAVIOR |
|---|---|
| $t_X = 12:00:10$ | X |

$$P_X = \frac{P_{1001}(t_{1002} - t_X) + P_{1002}(t_X - t_{1001})}{t_{1002} - t_{1001}}$$

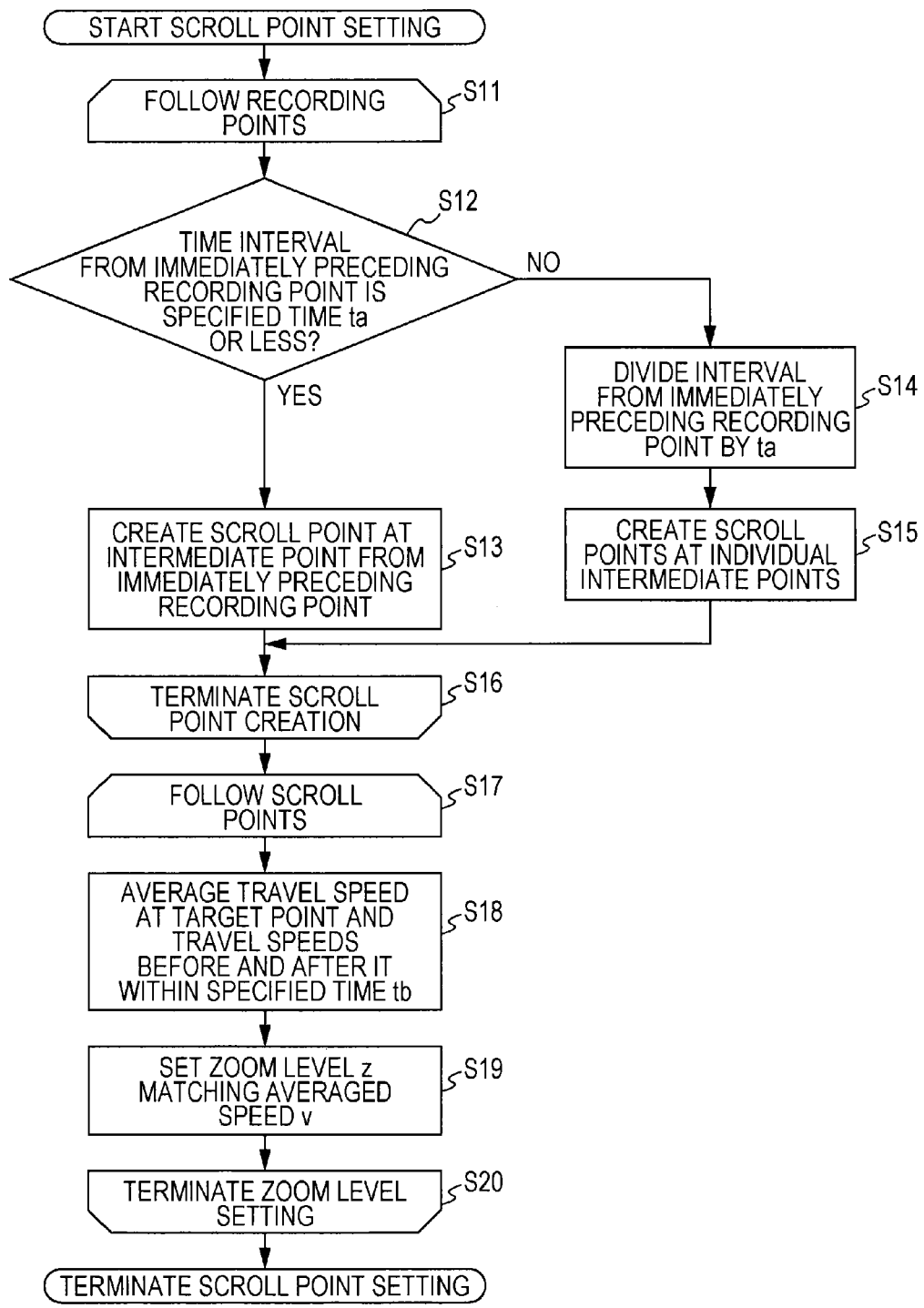

TERMINAL DEVICE, INFORMATION PROCESSING METHOD, AND PROGRAM

CROSS REFERENCE TO RELATED APPLICATION

The present application claims the benefit of the earlier filing date of U.S. Provisional Patent Application Ser. No. 61/551,494 filed on Oct. 26, 2011, the entire contents of which is incorporated herein by reference.

BACKGROUND

1. Field of the Disclosure

The present disclosure relates to a terminal device that is preferably applied to a mobile phone terminal, an information processing method executed in the terminal device, and a program, and more specifically, it relates to a technology that displays a travel history of a user that carries the terminal device.

2. Description of Related Art

Terminals devices incorporating a positioning unit based on, for example, the Global Positioning System (GPS) have come into widespread use as mobile phone terminals and the like. When a terminal device has this type of positioning unit, the terminal device can display a map around the current position measured by the positioning unit.

A history of positions measured by the positioning unit is also stored in a memory provided in the terminal device so that a display unit displays a history of changes of the stored positions, that is, a route through which the user has traveled, on a map.

SUMMARY

When a previous travel trace is displayed on a map, however, the scale of a displayed map has been a predetermined scale or a scale that has been already set at the time of displaying on the terminal device. In this situation, a map has not been necessarily displayed on an appropriate scale.

Another problem is that, if a travel trace is simply displayed on the map, the state of the user's travel on the trace cannot be easily known. Specifically, for example, even if the user stopped for a long time at a point on the displayed trace, this state could not be known from the travel trace. When only a travel trace is displayed, it has been difficult to distinguish between a case in which the user rode some type of vehicle and traveled at high speed and a case in which the user walked at low speed.

The inventor of this application is aware of the need to display a previous trace on a map on an appropriate scale according to a previous travel history.

According to a first exemplary embodiment, the disclosure is directed to a terminal device that includes a display that displays an image; a positioning unit that measures a current position; a memory that stores information corresponding to a plurality of positions measured by the positioning unit in association with a time at which each of the plurality of positions was measured; and a controller that controls the display to display a travel trace on a map based on the information stored in the memory and that variably sets a display scale of the map according to a travel speed or traveled distance per unit time corresponding to the travel trace.

According to another exemplary embodiment, the disclosure is directed to a method performed by an information processing apparatus, the method comprising: measuring, by a positioning unit of the information processing apparatus, a current position; storing, in a memory of the information processing apparatus, information corresponding to a plurality of positions measured by the positioning unit in association with a time at which each of the plurality of positions was measured; controlling a display to display a travel trace on a map based on the information stored in the memory; and setting a display scale of the map based on the travel trace.

According to another exemplary embodiment, the disclosure is directed to a non-transitory computer-readable medium including computer-program instructions, which when executed by an information processing apparatus, cause the information processing apparatus to perform a method comprising: measuring a current position; storing information corresponding to a plurality of positions measured by the positioning unit in association with a time at which each of the plurality of positions was measured; controlling a display to display a travel trace on a map based on the information stored in the memory; and setting a display scale of the map based on the travel trace.

According to an embodiment of the present disclosure, when a travel trace based on previously measured positions is displayed on a map, the map is displayed on a display scale according to the travel speed or traveled distance per unit time. Therefore, the travel trace is thereby indicated on a map displayed on an appropriate scale.

BRIEF DESCRIPTION OF DRAWINGS

FIG. 3 illustrates an example of a process to associate behavior information in the embodiment with positions.

FIG. 5 is a flowchart illustrating an example of a process to set scroll points in the embodiment.

DETAILED DESCRIPTION

Examples of a terminal device, an information processing method, and a program according to an embodiment of the present disclosure will be described with reference to the drawings in the following order.

1. Example of the structure of the terminal device (FIGS. 1 and 2)
2. Recording of positional information and examples of travel trace displays (FIGS. 3 and 4)
3. Example of setting scroll points (FIG. 5)
4. Example of a process to display a travel trace (FIGS. 6 to 9)
5. Variations

[1. Example of the Structure of the Terminal Device]

Figure 1:
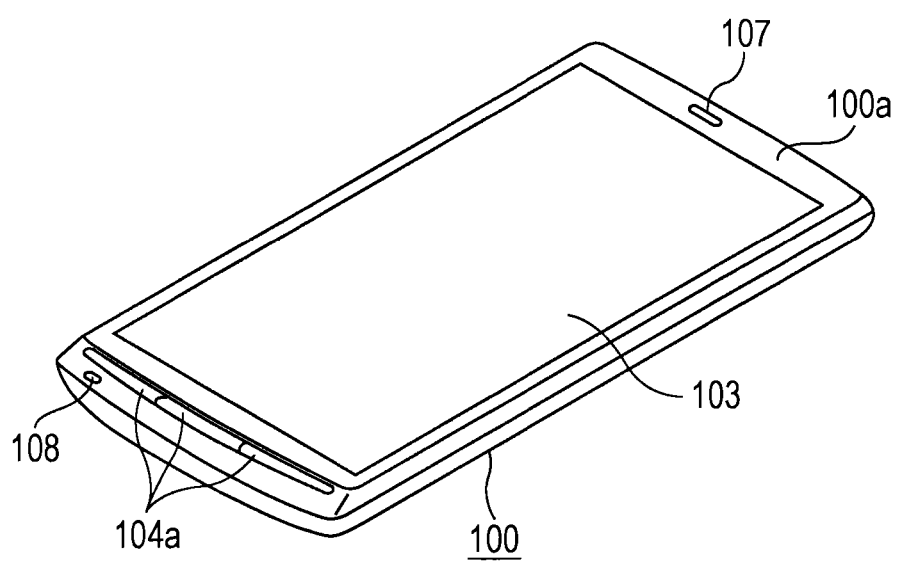
FIG. 1 is a perspective view illustrating an example of the shape of a terminal device according to an embodiment of the present disclosure.

FIG. 1 illustrates the general structure of a terminal device according an embodiment of the present disclosure. A display unit 103 and manipulation keys 104*a* are mounted on the front surface of the terminal device 100. The manipulation keys 104a are members constituting part of a manipulation unit 104 described later.

The display unit 103 includes a display panel formed with a liquid crystal display (LCD), organic electroluminescent (EL), or the like and a driving circuit for the display panel. A relatively large display panel with a screen a diagonal length of which is about four inches (about 10 cm), for example, is used. The display unit 103 has a touch panel laminated on the display panel. That is, the touch panel of the display unit 103 functions as a manipulation unit 104. A capacitive touch panel, for example, is used as the touch panel.

A speaker 107 and microphone 108 for a call are mounted on the front surface of the terminal device 100.

Next, an example of the internal structure of the terminal device 100 will be described with reference to FIG. 2.

The terminal device 100, which is a mobile phone terminal, includes an antenna 101 used to transmit radio waves to and receive radio waves from a wireless base station, a communication processing unit 102 to which the antenna 101 is connected, and a controller 110.

The communication processing unit 102 carries out wireless communication with a wireless base station under control of the controller 110. During a voice call, the communication processing unit 102 supplies voice data included in received data to a voice processing unit 106. The voice processing unit 106 decodes supplied voice data and obtains an analog voice signal. The voice processing unit 106 supplies the obtained analog voice signal to the speaker 104. The speaker 104 outputs a voice from the received analog voice signal.

The microphone 108, which picks up sounds, supplies a voice signal output from the microphone 108 to the voice processing unit 106. The voice processing unit 106 encodes the received voice signal into voice data in a prescribed encoding format. The voice processing unit 106 then supplies the encoded voice data to the communication processing unit 102. The communication processing unit 102 packetizes the supplied voice data to transmission format and modulates the voice data for use in transmission. The communication processing unit 102 supplies the modulated transmission signal to the antenna 101. The transmission signal is then radiated from the antenna 101 as a wireless radio wave.

The processing units such as the communication processing unit 102 and voice processing unit 106 each transmit and receive control data to and from the controller 110 through a control line 150, and also transmit data through a data line 160.

The terminal device 100 has the display unit 103 and manipulation unit 104. Displays on the display unit 103 are controlled by the controller 110. The display unit 103 displays information needed to originate and receive calls, information such as addresses and messages of electronic mail, images obtained through a connection to the Internet, information obtained as a result executing functions of the terminal device 100, and other types of information. It is also possible for the display unit 103 to provide a map display described later. The manipulation unit 104 is formed with the manipulation keys 104a (FIG. 1) mounted on the terminal device 100 and the touch panel laminated on the display unit 103, as described above; the manipulation unit 104 supplies commands made by user's manipulations to the controller 110.

The controller 110 is formed with, for example, a microprocessor; it executes communication control, voice processing and its control, image processing and its control, and the like. The controller 110 also executes image drawing processing by which a map and travel history described later are displayed. The controller 110 is connected to a memory 105 through the control line 150 and data line 160. The controller 110 reads out data and programs stored in the memory 105. The controller 110 also stores various types of data in the memory 105. One of data items stored in the memory 105 is positional information measured by a positioning unit 130 described later. Map data may be stored in the memory 105.

The terminal device 100 also includes a camera 120. The camera 120 takes pictures under control of an imaging controller 121. Data of still pictures or moving pictures taken by the camera 120 is stored in the memory 105. When an image taken by the camera 120 is stored in the memory 105, information about a photography position is added. The information about the photography position is acquired from the positioning unit 130 described next.

The terminal device 100 also includes the positioning unit 130. The positioning unit 130 uses the Global Positioning System (GPS) to measure the current position. Specifically, the positioning unit 130 performs reception processing on signals, sent from GPS satellites, that have been obtained through a GPS antenna 131. Positional information about the current position measured by the positioning unit 130 is supplied to the controller 110. Upon acquisition of the current position from the positioning unit 130, the controller 110 carries out processing related to the positional information, the processing being required by an application that is being activated. When an application that displays a map around the current position is being activated in the terminal device 100, for example, the controller 110 acquires map information around the current position.

The information about the current position measured by the positioning unit 130 is stored in the memory 105 under control of the controller 110. When the information about the current position is stored in the memory 105, the date and time of measurement are also stored together. The current position is stored in the memory 105 at intervals of a fixed distance or a fixed time. However, positioning may not be carried out at fixed intervals because, for example, signals cannot be received from satellites, so positioning is not necessarily carried out at intervals of a fixed cycle or fixed distance.

Information about previously measured positions stored in the memory 105 in this way is read out by the controller 110 as a previous travel history of the terminal device 100, and a previous travel trace is displayed on the display unit 103.

The terminal device 100 also includes an external device connecting unit 140. The external device connecting unit 140 has a slot into which a memory card is inserted, for example. The controller 110 stores data that it has read out from the memory 105 or the like in an external storage unit (memory card) 200 inserted into the slot. The controller 110 reads out data stored on the external storage unit 200. The information about the current position described above may be stored on the external storage unit 200.

[2. Recording of Positional Information and Examples of Travel Trace Displays]

The terminal device 100 in this embodiment displays a previous travel trace based on measured positions stored in the memory 105. Processes required to display this previous travel trace will be described.

FIG. 3 illustrates an example of positional information stored in the memory 105. The storing of positional information in the memory 105 is started when, for example, a recording start button displayed by the display unit 103 is touched, and is terminated when, for example, a recording end button is touched. One travel history from the start to the end is handled as a travel history in one unit.

As illustrated in FIG. 3, time t at which positioning was carried out and measured position P at that time are stored in the memory 105. For example, a position measured at time $t_{1000}$ (12 hours, 00 minutes, 00 seconds) is stored as position $P_{1000}$ in the memory 105. A position measured at a next positioning timing, which is time $t_{1001}$ (12 hours, 00 minutes, 05 seconds), is stored as position $P_{1001}$ in the memory 105. A time and measured position are stored at each positioning timing. The memory 105 stores the current positional information of the terminal device 100 together with positioning time information in this way. The storing of this current positional information is carried out, starting from, for example, the position of the previous recording, each time a fixed distance is traveled. When the positioning unit 130 measures a position at least five meters apart from the position of the previous recording, for example, the measured position at that time is stored in the memory 105. Alternatively, positions measured by the positioning unit 130 may be stored in the memory 105 at fixed time intervals, for example, at five-second intervals.

When measured positions are stored at intervals of a fixed distance, the controller 110 may obtain measured positions located at intervals of a fixed time through an interpolation operation and may store the obtained positions in the memory 105. In the example illustrated in FIG. 3, for example, positioning timings after time $t_{1001}$ (12 hours, 00 minutes, 05 seconds) are time $t_{1002}$ (12 hours, 00 minutes, 13 seconds), time $t_{1003}$ (12 hours, 00 minutes, 20 seconds), . . . , which are not at intervals of a fixed time.

There is a case in which the controller 110 requires positions at specific timings, which differ from positioning timings, to obtain scroll points described later. When positions at specific timings, which differ from positioning timings, are necessary, positions at the specific timings are acquired through an operation in the controller 110, and the acquired positions are stored in the memory 105.

Specifically, as illustrated in FIG. 3, for example, suppose that the controller 110 requires position $P_x$ at time $t_x$ (12 hours, 00 minutes, 10 seconds). Then, the controller 110 interpolates stored data at time $t_{1001}$ and time $t_{1002}$ before and after that time $t_x$ to infer position $P_x$ at time $t_x$ (12 hours, 00 minutes, 10 seconds). The inferred position $P_x$ is stored in the memory 105 under control of the controller 110.

Position $P_x$ is calculated according to the following equation.

$$P_x = [P_{1001}(t_{1002} - t_x) + P_{1002}(t_x t_{1001})]/(P_{1002} t_{1001})$$

Next, a display format in which the display unit 103 of the terminal device 100 displays a previous travel history according to previously measured positions stored in the memory 105 will be described with reference to FIG. 4. The display unit 103 provides a display when the controller 110 reads out information recorded in the memory 105 in response to an operation command, made on the manipulation unit 104, which enables a travel history display mode. Map information required to provide the display is acquired by, for example, accessing a map information providing site on the Internet through wireless communication carried out by the communication processing unit 102 and causing the terminal device 100 to acquire the map information from the map information providing site. Alternatively, the map information may be prestored in the memory 105 and the controller 110 may use the map information read out from the memory 105 for the display.

A display format of the travel history shown in FIG. 4A will be described. A position at a time is indicated by a mark M on a road map around the position. A travel history to the position indicated by the mark M is indicated as a travel route R1 on the road map displayed by the display unit 103. In the example in FIG. 4A, the travel route R1 is indicated by the thick line. As the travel history proceeds, therefore, the position of the mark M moves and the travel route R1, which is a travel trace, extends on the map.

The display unit 103 also displays a time TM1 and a travel speed SP1 at the lower right corner of the road map. The time TM1 is a display of a time at which the position indicated by the mark M was measured. Although, in the example in FIG. 4, the display unit 103 displays a time in a hours:minutes:seconds format, a date may be displayed together. The travel speed TM1 is a display of a speed (distance per hour) that the controller 110 calculated from the travel history near the current position.

The display unit 103 also displays a reproduction button 104 at the central bottom of the road map, a fast-forward button 104c to the right of the reproduction button 104b, and a backward button 104d to the left of the reproduction button 104b. When a touch of one of these buttons 104b, 104c, and 104d is detected, the relevant operation is commanded.

Furthermore, a reproduction speed zoom ratio SP2 is displayed at the lower left corner of the load map. The reproduction speed zoom ratio SP2 is a speed at which the mark M indicating the current position moves on the map. When, as illustrated in FIG. 4A, for example, the reproduction speed zoom ratio SP2 is a 16-fold reproduction speed zoom ratio [16×], the time TM1 displayed on the display unit 103 changes at a speed 16 times faster when compared with the actual time. The current position indicated by the mark M displayed by the display unit 103 on the road map moves at a speed 16 times faster when compared with the actual time, and the travel route R1 extends on the map. When the display unit 103 displays a travel history, the recording unit of which is, for example, 16 minutes, with a reproduction speed zoom ratio of [16×], therefore, the mark M moves on the display screen from the beginning of the history to the end in one minute.

The reproduction speed zoom ratio SP2 is an initial speed (16-fold speed, for example) that is predetermined by the touch of the reproduction button 104b. Upon detection of a touch of the fast-forward button 104c, the controller 110 sets the reproduction speed zoom ratio to a speed faster than the current speed setting. Upon detection of a touch of the backward button 104d, the controller 110 sets the reproduction speed zoom ratio to a speed slower than the current speed setting. When the fast-forward button 104c is touched, for example, the controller 110 sets the reproduction speed zoom ratio to twice the current speed. When the backward button 104d is touched, the controller 110 sets the reproduction speed zoom ratio to half the current speed.

The line L displayed at the bottom of the screen as a progress bar is a line indicating the entire travel history displayed this time; the pointer 104e on the line L indicates the current progress state in the entire travel history. Specifically, when the current position of the pointer 104e is a position advanced about one-seventh from the left end of the line L, for example, the mark M displayed by the display unit 103 indicates a position advanced about one-seventh of the travel history.

If a touch is made to move the position of the pointer 104e along the line L, the controller 110 moves the position of the mark M indicating the current position according to the movement of the pointer 104e. If, for example, the position of the pointer 104e is moved to the right end of the line L by a touch, the controller 110 moves the position indicated by the mark M to the end of the travel history.

Figure 4A:
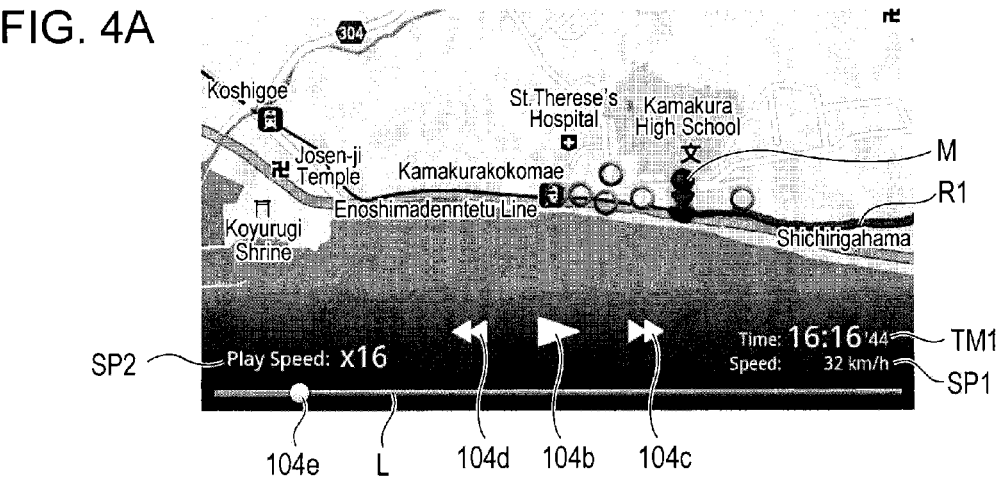
FIG. 4 illustrates map display examples in the embodiment.
Figure 4B:
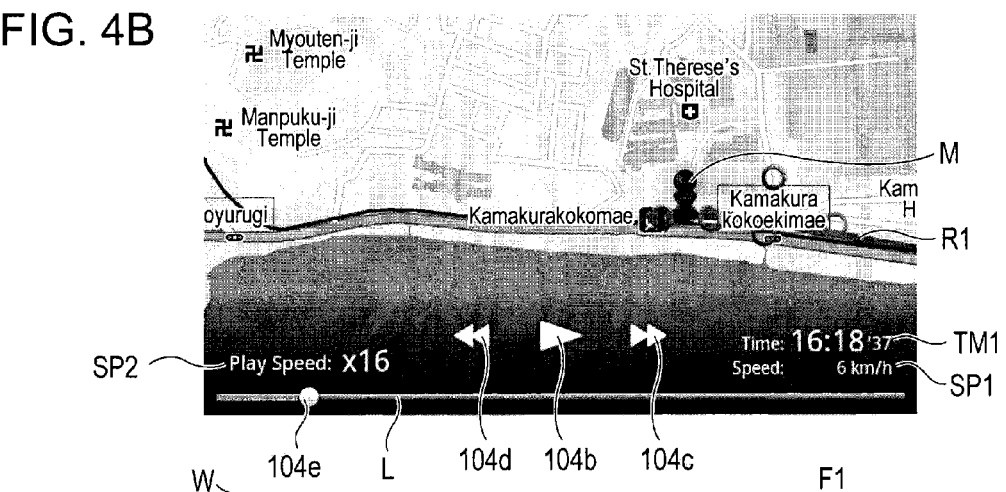

The travel history display shown in FIG. 4B is an example in which a position about two minutes ahead of the travel history display shown in FIG. 4A is displayed. In this display example, the position indicated by the mark M remains almost unchanged; it has just changed from the time shown in FIG. 4A (16 hours, 16 minutes, 44 seconds) to the time shown in FIG. 4B (16 hours, 18 minutes, 37 seconds). At the display timing shown in FIG. 4B, the travel speed SP1 has been reduced from the 32 km/h to 6 km/h and the display scale of the map has been thereby changed.

Figure 4C:
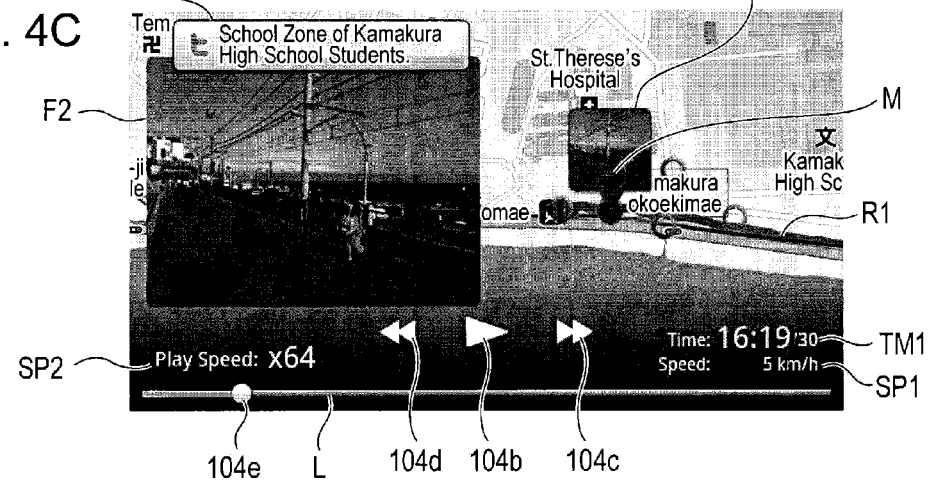

The travel history display shown in FIG. 4C is an example in which the position indicated by the mark M of an image taken by the camera 120 has reached the position stored in the memory 105.

In the example in FIG. 4C, a photographed image F1 is displayed with a small size near the position indicated by the mark M, and a photographed image F2 is displayed with a relatively large size on the left side of the screen.

The small-sized photographed image F1 remains displayed on the map even when the position indicated by the mark M proceeds. The large-sized photographed image F2 is displayed only when a touch is made to select this photographed image F1. Alternatively, the large-sized photographed image F2 is automatically popped up under control of the controller 110 only when the position indicated by the mark M comes close to the photography position. If the photographed image F2 is uploaded to a specific service site on the Internet such as Social Network Service (SNS), a character string W, such a comment, attached to the image at that time is popped up.

A display of a travel history given by the display unit 103 together with a photographed image and commented text is just an example. If the controller 110 can detect a behavior during the travel according to, for example, recorded data in the memory 105, the display unit 103 may provide a display from which the behavior detected by the controller 110 can be seen.

The three travel history displays shown in FIGS. 4A, 4B, and 4C are examples in which the mark M is displayed substantially at a specific position (a position slightly displaced to the right from the center of the screen). In the examples in FIGS. 4A, 4B, and 4C, differences among the recording times are about several minutes and the display range of the road map on the display unit 103 changes little by little.

As seen from the changes in FIGS. 4A, 4B, and 4C, the controller 110 performs a scroll process by which the display range of the road map on the display unit 103 is changed to an adjacent range little by little. When moving the display range, the controller 110 displays a map on an appropriate display scale. Next, control processes, executed by the controller 110, that are needed to move the display range of the road map and to set a display scale of the road map will be described.

3. Example of Setting Scroll Points

The flowchart in FIG. 5 illustrates a process to set scroll points, which are necessary to move the map display range of the travel history. The scroll point setting process is executed by the controller 110 for each travel history recorded in the memory 105. The scroll point setting process is executed in response to, for example, a command to display a travel history. Alternatively, the scroll point setting process may be executed when one unit of travel history is stored in the memory 105 under control of the controller 110.

The scroll point setting process will be described with reference to FIG. 5. Upon the start of the scroll point setting process for one unit of travel history recorded in the memory 105, the controller 110 starts a process to follow recording points on the travel history (step S11). In the process to follow recording points, the controller 111 decides whether a time interval from the immediately preceding recording point is a preset specified time ta or less (step S12). If the time interval is the specified time ta or less, the controller 110 takes the position at the midpoint between the immediately preceding recording point and the current recording point as a scroll point (step S13). If it is decided in step S12 that the time interval from the immediately preceding recording point exceeds the preset specified time ta, the controller 110 interconnects the immediately preceding recording point and the current recording point with a straight line. The controller 110 then performs linear interpolation between the immediately preceding recording point and the current recording point and infers divided points, on the line obtained from the linear interpolation, which are separated at intervals of the specified time ta (step S14). The controller 110 then uses the immediately preceding recording point, divided points, and current recording point to determine an intermediate position between adjacent points and set the determined intermediate position as a scroll point (step S15).

Upon completion of scroll point setting in step S13 or step S15, the controller 110 returns to step S11 as long as the travel history continues and executes the scroll point setting process in steps S12 to S15 (step S16).

When the scroll point setting process for the travel history is completed in step S16, the controller 110 shifts to the process to follow the set scroll points (step S17). Upon the start of the process to follow the set scroll points, the controller 110 averages the travel speed v at a target point and travel speeds before and after it within a specified time tb (step S18). The specified time tb is sufficiently longer than the time ta used to set scroll points.

The controller 110 then sets a zoom level z, which is a display scale, the zoom level matching the travel speed obtained by the above averaging (step S19). As for correspondence between the travel speed v and the zoom level z, the zoom level z is calculated by assigning the travel speed v to a calculation equation. Alternatively, the controller 110 determines the zoom level z with reference to a table indicating correspondence between the travel speed v and the zoom level z.

When the zoom level z is obtained from a calculation equation, for example, the following equation is used.

$$\text{Zoom level } z = 2^{\alpha v} z_0$$

In this equation, v is the travel velocity, $z_0$ is a reference zoom level, and $\alpha$ is a constant. The controller 110 obtains zoom levels at a plurality of stages, which have a fixed relationship to the travel speed, through an operation using this equation.

When referencing the table indicating correspondence between the travel speed v and the zoom level z, the controller 110 sets the zoom level z at about three stages according to, for example, the average travel speed v. When the average travel speed v is from 0 km/h to 20 km/h or less, for example, the controller 110 sets the zoom level z to 18. When the average travel speed v exceeds 20 km/h but is 100 km/h or less, the controller 110 sets the zoom level z to 17. When the average travel speed v exceeds 100 km/h, the controller 110 sets the zoom level z to 16.

Upon completion of the zoom level setting in step S19, the controller 110 returns to step S17 until there are no more scroll points, and executes the zoom level setting process in steps S18 and S19 (step S20). Information about the scroll points and zoom levels that the controller 110 has obtained in these processes is stored in the memory 105.

The larger the value of the zoom level is, the larger the scale of the map is, displaying a more detail map. In this example, three values, 16, 17, and 18, selected from many prepared zoom levels are used as the zoom level z when the travel history is displayed.

[4. Example of a Process to Display a Travel Trace]

Figure 6:
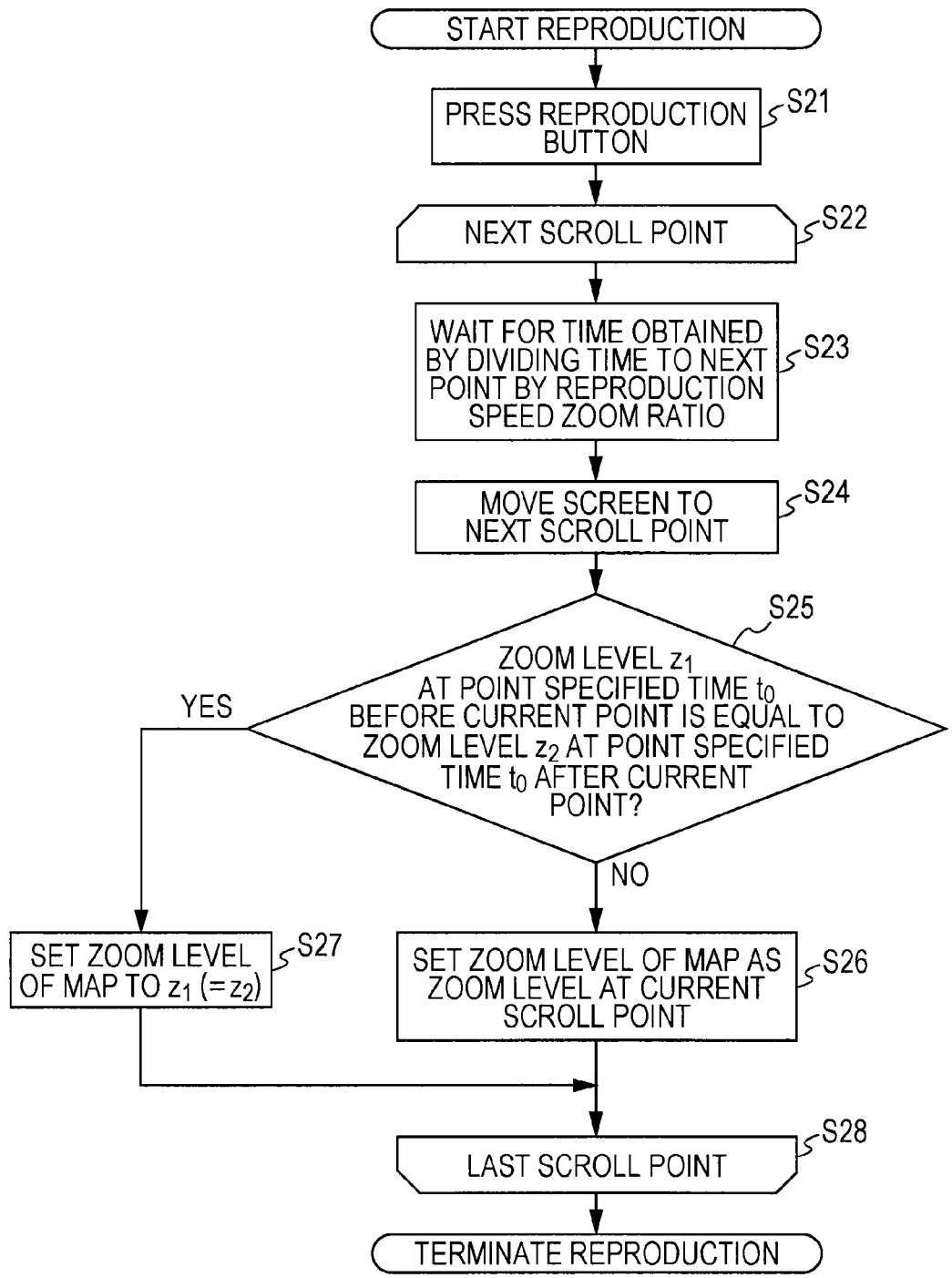
FIG. 6 is a flowchart illustrating an example of a process to scroll a map display in the embodiment.

Next, a process to scroll the displayed map in response to a manipulation to reproduce the travel history will be described with reference to the flowchart in FIG. 6. The process to scroll the displayed map is carried out by the controller 110 according to the scroll points and zoom levels set in the flowchart in FIG. 5.

First, when a travel history reproduction mode is entered, the display unit 103 displays the reproduction button 104*b* (FIG. 4) on the screen; when a press of the reproduction button 104*b* is detected, a process to follow the travel history is started (step S21). When the process to follow the travel history is started, the display unit 103 displays the scroll points in the travel history in succession (step S22). Specifically, the display unit 103 gives a display so that a first scroll point is located at a particular position. If there is a next scroll point for the scroll point displayed at the particular position at present, the controller 110 acquires a time obtained by dividing a time to the two scroll points by the reproduction speed zoom ratio. The display unit 103 then waits for the acquired time without changing the screen display (step S23). When the wait time in step S23 expires, the display unit 103 performs a scroll process to locate a next scroll point at the particular position on the screen (step S24).

The controller 110 then decides whether a zoom level $z_1$ at a point a specified time $t_0$ before the current scroll point is equal to a zoom level $z_2$ at a point the specified time $t_0$ after the current scroll point (step S25). The specified time $t_0$ is a relatively short time corresponding to the scroll point interval.

If it is decided in step S25 that the zoom level $z_1$ at the scroll point immediately before the current point is not equal to the zoom level $z_2$ at the scroll point immediately after the current point, the display unit 103 displays the map with the zoom level set for the current scroll point (step S26).

If it is decided in step S25 that the zoom level $z_1$ at the scroll point immediately before the current point is equal to the zoom level $z_2$ at the scroll point immediately after the current point, the display unit 103 sets the zoom level of the displayed map to the immediately preceding and immediately following zoom level $z_1$ ($=z_2$) (step S27).

Zoom levels of the map displayed by the display unit 103 are set under control of the controller 110 in this way. The controller 110 repeats the process from step S22 to step S27 as long as there is a next scroll point. When deciding that the display is at the last scroll point (step S28), the controller 110 terminates the movement of the map display.

Since the controller 110 sets a zoom level according to the travel speed at each scroll point in this way, the display unit 103 displays a map on an optimum scale when displaying the travel history. For example, a trace display during a travel by walking is provided on a detailed map display. A trace display during a high-speed travel is provided on a map display in a wide range.

Figure 7:
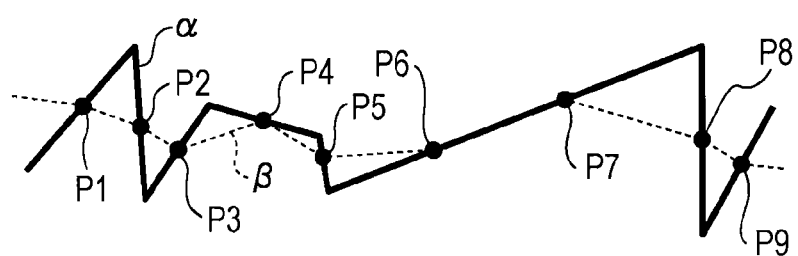
FIG. 7 illustrates an example of scroll point setting in the embodiment.

FIG. 7 illustrates an example of a relationship between scroll points and a trace a of the travel history created according to the travel history. In this example, scroll points P1, P2, P3, . . . are set by executing a process by which a scroll point is set at the midpoint between two adjacent recording points according to step S13 in the flowchart illustrated in FIG. 5 and, if the time interval between the recording points is relatively long, the interval is further divided. Each of scroll points P1, P2, P3, . . . has a zoom level that matches the travel speed at that scroll point.

In this case, the display unit 103 uses the trace α that follows the travel history to display the travel trace. Scroll lines β, which connect scroll points P1, P2, P3, . . . with straight lines, are displayed besides the trace α. The controller 110 uses the scroll lines β in the process to scroll the display. The use of the trace β, which is generally smoother than the trace α, enables suppression of the event that the screen appears to be ragged at the time of reproduction.

When providing displays centered around scroll points P1, P2, P3, . . . , the display unit 103 displays maps according to the zoom levels of these scroll points.

Figure 8:
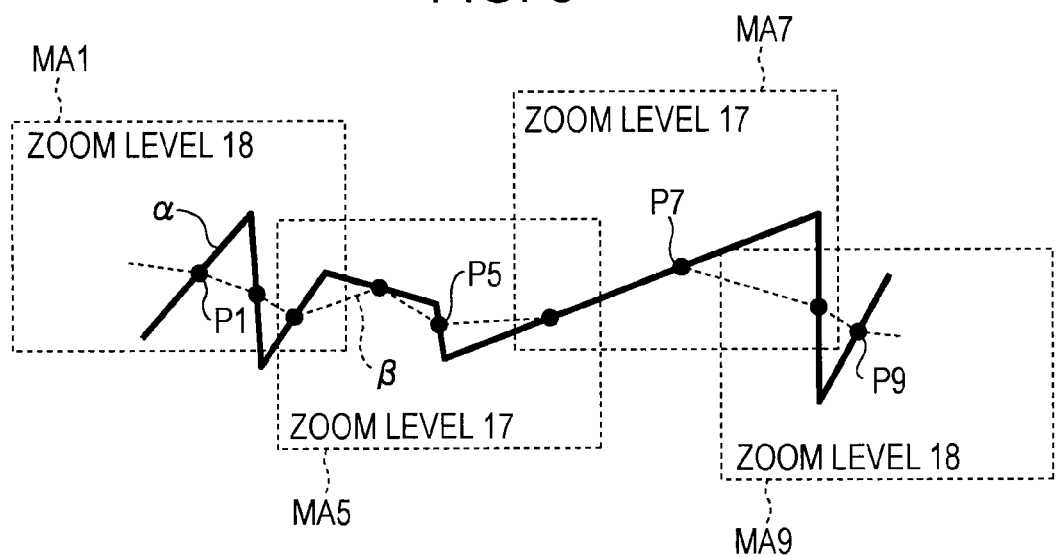
FIG. 8 illustrates an example of scroll point setting and display scale setting.

FIG. 8 illustrates an example of display ranges MA1, MA2, MA3, and MA4 of road maps at four scroll points, P1, P5, P7, and P9 in a case in which the trace α and scroll lines β are set as in FIG. 7.

For example, as illustrated in FIG. 8, the travel speed in the vicinity of scroll point P1 is relatively low, so the zoom level is set to 18 under control of the controller 110 when the display unit 103 displays a map centered around scroll point P1. The display unit 103 displays a road map with display range MA1, which has been set at a zoom level of 18.

After that, the display unit 103 displays a map centered around scroll point P2, a map centered around scroll point P3, and so on; the maps displayed by the display unit 103 change as the scroll points are followed. Suppose that, for example, the travel speed at scroll point P5 has changed to 17. Then, the map displayed centered around scroll point P5 is a road map with display range MA5 corresponding to a zoom level of 17, which is a display the scale of which is smaller than a zoom level of 18. The map displayed by the display unit 103 centered around scroll point P7 is also a road map with display range MA7 corresponding to the zoom level of 17.

Furthermore, for example, suppose that the zoom level at scroll point P9 has changed to 18. The map displayed at that time by the display unit 103 centered around scroll point P9 is a road map with display range MA9 corresponding to the zoom level of 18, making the scale of the display larger than at the zoom level of 18.

In this way, the display unit 103 displays a map with an appropriate display range, that is, on an appropriate display scale at each scroll point, according to the travel speed near the scroll point.

Figure 9:
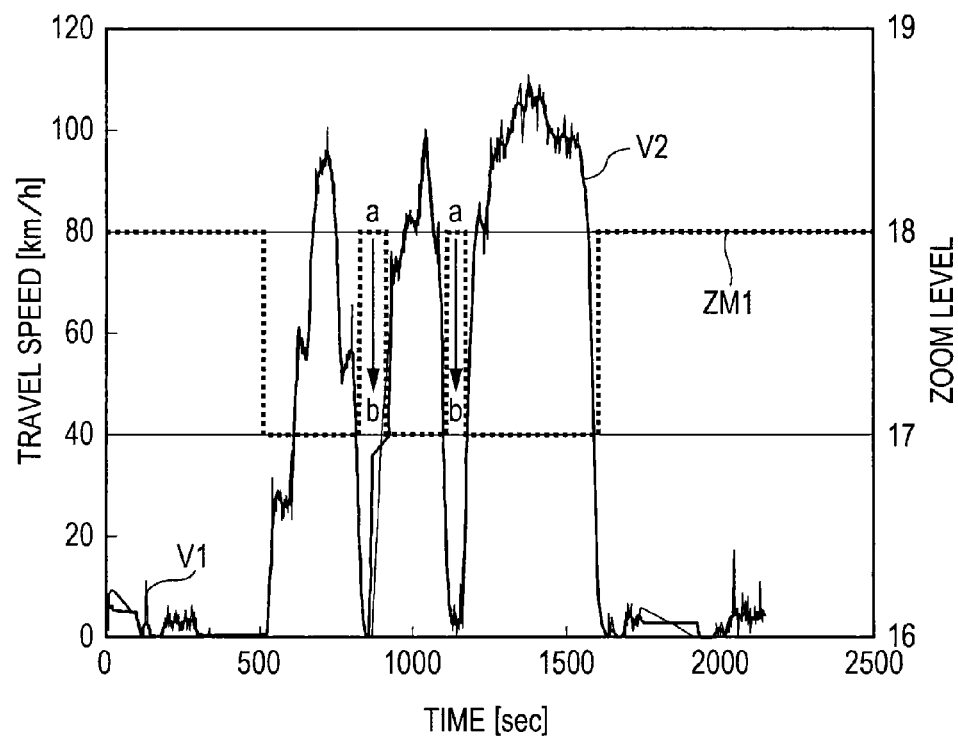
FIG. 9 illustrates correspondence between travel speed and scale in the embodiment.

FIG. 9 represents changes in the travel speed obtained from the travel history and changes in the zoom level by using a graph. In FIG. 9, the horizontal axis is the time axis [seconds], and the vertical axis indicates the travel speed [km/h] and zoom level. The travel speed V1 in FIG. 9, which is indicated by the thin lines and is obtained from the travel history, indicates changes in the travel speed obtained from the actual travel history. The travel speed V2 indicated by the bold lines is obtained by averaging the travel speed V1 at intervals of a fixed time.

Figure 2:
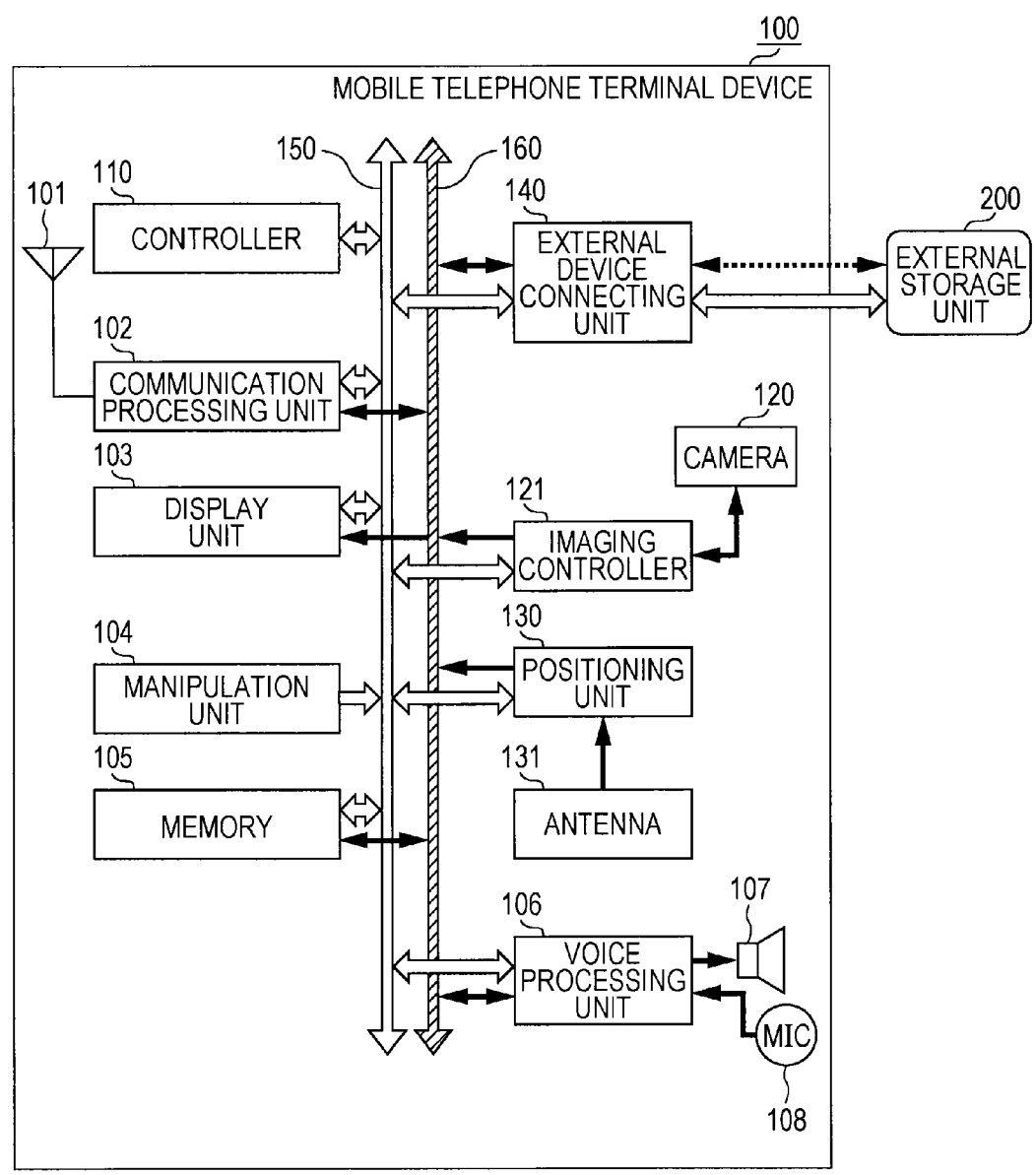
FIG. 2 is a block diagram indicating an example of the structure of the terminal device according to the embodiment.

Zoom level ZM1 indicated by the dashed lines in FIG. 2 is determined from this averaged travel speed V2. As illustrated in FIG. 9, when the travel speed of the terminal device 100 is a relatively low speed, the zoom level is 18; when the travel speed of the terminal device 100 is a relatively high speed, the zoom level is 17. However, the controller 110 executes the process in step S25 in the flowchart illustrated in FIG. 6. Therefore, when the travel speeds before and after the current scroll point are equal to each other, even if the travel speeds differ from the travel speed obtained from the current scroll point, the controller 110 sets a zoom level corresponding to the travel speed before and after the current scroll point. For example, the controller 110 corrects a segment "a" in which the zoom level temporarily changes from 17 to 18 in changes indicated as zoom level ZM1 to a segment "b" in which the zoom level is 17 to match the zoom level before and after the segment.

Since the zoom level is set as described above, the display unit 103 displays maps in a preferable display form in which short-period changes in the zoom level caused by temporary changes in the travel speed are suppressed.

[5. Variations]

The process, described in the above embodiment, in which the controller 110 obtains a zoom level from the travel speed by using a calculation equation or with reference to a correspondence table is just an example. The controller 110 may obtain a zoom level in another process. For example, the terminal device 100 may have an acceleration sensor and the controller 110 may decide an acceleration state detected by the acceleration sensor. The controller 110 then decides whether the detected acceleration state is equivalent to acceleration during walking or acceleration during a relatively high-speed travel by vehicle. If the acceleration is decided to be equivalent to acceleration during walking, the controller 110 sets a zoom level at which the scale is large. If the acceleration is decided to be equivalent to acceleration during a high-speed travel, the controller 110 sets a zoom level at which the scale is small. To set a zoom level, the controller 110 may use a vibration sensor that detects an amount of vibration instead of the acceleration sensor.

When calculating a zoom level by using the calculation equation, the controller 110 may use another operational equation. For example, a zoom level may be set so that the value of [map scale]×[traveled distance] becomes substantially constant between scroll points.

The controller 110 may also decide a traveled distance at fixed time intervals instead of the travel speed, and may set a zoom level according to the traveled distance.

When the controller 110 obtains zoom levels through an operation or the like, more zoom levels than the three zoom levels described above may be set.

FIG. 4C has illustrated an example in which, a photographed image is popped up together with a text comment uploaded to a particular service site on the Internet when the display unit 103 displays a travel trace. If the controller 110 can detect another behavior during the travel, however, the detected behavior may be displayed together with the travel trace. For example, the controller 110 may acquire histories of times at which a process or manipulation was carried out with the terminal device 100, such as a call history, electronic mail transmission history, electronic mail reception history, and music reproduction history, and the display unit 103 may display these histories together with the travel history under control of the controller 110.

Although, in another example in the embodiment described above, the terminal device in the present disclosure has been applied to a mobile telephone terminal device, this is not a limitation. The terminal device can be applied to any other types of terminal devices that can measure the current position and can display a map.

The positioning unit, which measures the current position, mounted on the terminal device may be a positioning unit that uses a positioning system other than the GPS. Alternatively, the terminal device may include both a positioning unit based on the GPS and another positioning unit based on another positioning system to improve positioning precision in a case in which signals from GPS satellites cannot be received.

In the above embodiment, an example has also been described in which a memory is used as the storage unit that stores the travel history and the like. However, a hard disk drive unit or another type of storage unit may store the travel history.

Although the above embodiment has been implemented as a terminal device as an example, a program (software) that executes the processes in the present disclosure may be created and the program may be installed in an existing information processing terminal device such as a computer.

The structure and processes described in the claims in the present disclosure are not limited to the embodiment described above. It will be understood by those skilled in the art that various modification and combinations and other embodiments may be derived from design or other elements within the range of the claims of the present disclosure or an equivalent range of the claims.

In addition to the various embodiments disclosed above, the present disclosure may be configured as follows:

(1) An information processing apparatus comprising: a display that displays an image; a positioning unit that measures a current position; a memory that stores information corresponding to a plurality of positions measured by the positioning unit in association with a time at which each of the plurality of positions was measured; and a controller that controls the display to display a travel trace on a map based on the information stored in the memory and that sets a display scale of the map based on the travel trace.

(2) The information processing apparatus of (1), wherein the controller sets the display scale of the map based on a travel speed or traveled distance per unit time determined based on the travel trace.

(3) The information processing apparatus of (1), wherein the displayed travel trace sequentially tracks the plurality of positions in order of time.

(4) The information processing apparatus of (1), wherein the controller controls the display to scroll the map in accordance with the travel trace.

(5) The information processing apparatus of (5), wherein the controller determines scroll points on the travel trace based on the information stored in the memory.

(6) The information processing apparatus of (5), wherein the controller sets a scroll line that linearly interconnects adjacent scroll points on the travel trace.

(7) The information processing apparatus of (6), wherein the controller controls the display to scroll the map along the scroll line.

(8) The information processing apparatus of (5), wherein the controller determines the scroll points by determining a difference in time between neighboring first and second positions of the plurality of positions and comparing the difference to a predetermined threshold value.

(9) The information processing apparatus of (8), wherein, when the difference is equal to or less than the threshold, the controller selects a midpoint between the first and second positions as a scroll point.

(10) The information processing apparatus of claim 8, wherein, when the difference is greater than the threshold, the controller interconnects points corresponding to the first and second positions with a straight line.

(11) The information processing apparatus of (10), wherein the controller performs linear interpolation between the points corresponding to the first and second positions and determines divided points on the straight line, which are separated at intervals corresponding to the predetermined threshold value.

(12) The information processing apparatus of (11), wherein the controller determines an intermediate position between the points corresponding to the first and second positions based on an immediately preceding recording point, divided points, and a current recording point and sets the determined intermediate position as a scroll point.

(13) The information processing apparatus of (6), wherein the controller determines, from the scroll line, an average travel time between the scroll points.

(14) The information processing apparatus of (13), wherein the controller controls a display scale of the map based on the average time between the scroll points.

(15) The information processing apparatus of (1), wherein the controller controls the display to display a time at which a position was measured on the display as the travel trace proceeds.

(16) The information processing apparatus of (1), further comprising: an image capturing unit, wherein the memory stores an image captured by the image capturing unit in association with a measured position at a time the image was captured.

(17) The information processing apparatus of (16), wherein the controller controls the display to display an indication that a captured image exists at a particular point along the trace track based on the information stored in memory.

(18) A method performed by an information processing apparatus, the method comprising: measuring, by a positioning unit of the information processing apparatus, a current position; storing, in a memory of the information processing apparatus, information corresponding to a plurality of positions measured by the positioning unit in association with a time at which each of the plurality of positions was measured; controlling a display to display a travel trace on a map based on the information stored in the memory; and setting a display scale of the map based on the travel trace.

(19) A non-transitory computer-readable medium including computer-program instructions, which when executed by an information processing apparatus, cause the information processing apparatus to perform a method comprising: measuring a current position; storing information corresponding to a plurality of positions measured by the positioning unit in association with a time at which each of the plurality of positions was measured; controlling a display to display a travel trace on a map based on the information stored in the memory; and setting a display scale of the map based on the travel trace

The invention claimed is:

1. An information processing apparatus comprising:
   a display that displays an image; and
   circuitry configured to
      store information corresponding to a plurality of determined positions of the information processing apparatus in association with a time at which each of the plurality of positions was determined;
      determine scroll points on a travel trace based on a difference in time between neighboring first and second positions of the plurality of positions;
      interconnect scroll points corresponding to the first and second positions with a straight line when the difference in time is greater than a predetermined threshold value;
      determine divided scroll points on the straight line that are separated at intervals corresponding to the predetermined threshold value;
      control the display to display the travel trace on a map; and
      set a display scale of the map based on the travel trace.

2. The information processing apparatus of claim 1, wherein the circuitry is configured to set the display scale of the map based on a travel speed or traveled distance per unit time determined based on the travel trace.

3. The information processing apparatus of claim 1, wherein the displayed travel trace sequentially tracks the plurality of positions in order of time.

4. The information processing apparatus of claim 1, wherein the circuitry is configured to control the display to scroll the map in accordance with the travel trace.

5. The information processing apparatus of claim 1, wherein the circuitry is configured to set a scroll line that linearly interconnects adjacent scroll points on the travel trace.

6. The information processing apparatus of claim 5, wherein the circuitry is configured to control the display to scroll the map along the scroll line.

7. The information processing apparatus of claim 5, wherein the circuitry is configured to determine, from the scroll line, an average travel time between the scroll points.

8. The information processing apparatus of claim 7, wherein the circuitry is configured to control the display scale of the map based on the average time between the scroll points.

9. The information processing apparatus of claim 1, wherein, when the difference is equal to or less than the predetermined threshold value, the circuitry is configured to select a midpoint between the first and second positions as a scroll point.

10. The information processing apparatus of claim 1, wherein the circuitry is configured to perform linear interpolation between the scroll points corresponding to the first and second positions to determine the divided scroll points on the straight line.

11. The information processing apparatus of claim 10, wherein the circuitry is configured to determine an intermediate position between the scroll points corresponding to the first and second positions based on an immediately preceding recording point, divided scroll points, and a current recording point and sets the determined intermediate position as a scroll point.

12. The information processing apparatus of claim 1, wherein the circuitry is configured to control the display to display a time at which a position was measured on the display as the travel trace proceeds.

13. The information processing apparatus of claim 1, further comprising:
   an image capturing unit, wherein the circuitry is configured to store an image captured by the image capturing unit in association with a measured position at a time the image was captured.

14. The information processing apparatus of claim 3, wherein the circuitry is configured to control the display to display an indication that a captured image exists at a particular point along the trace track based on the stored information.

15. A method performed by an information processing apparatus, the method comprising:
   storing, in a memory of the information processing apparatus, information corresponding to a plurality of determined positions of the information processing apparatus in association with a time at which each of the plurality of positions was determined;
   determining scroll points on a travel trace based on a difference in time between neighboring first and second positions of the plurality of positions;
   interconnecting scroll points corresponding to the first and second positions with a straight line when the difference in time is greater than a predetermined threshold value;

determining divided scroll points on the straight line that are separated at intervals corresponding to the predetermined threshold value;

controlling a display to display the travel trace on a map; and setting a display scale of the map based on the travel trace.

16. A non-transitory computer-readable medium including computer-program instructions, which when executed by an information processing apparatus, cause the information processing apparatus to perform a method comprising:

storing information corresponding to a plurality of determined positions of the information processing apparatus in association with a time at which each of the plurality of positions was determined;

determining scroll points on a travel trace based on a difference in time between neighboring first and second positions of the plurality of positions;

interconnecting scroll points corresponding to the first and second positions with a straight line when the difference in time is greater than a predetermined threshold value;

determining divided scroll points on the straight line that are separated at intervals corresponding to the predetermined threshold value;

controlling a display to display the travel trace on a map; and setting a display scale of the map based on the travel trace.

* * * * *